United States Patent
Ohara et al.

(10) Patent No.: US 10,237,482 B2
(45) Date of Patent: Mar. 19, 2019

(54) MONITORING CAMERA AND SWING CORRECTION METHOD

(71) Applicant: PANASONIC INTELLECTUAL PROPERTY MANAGEMENT CO., LTD., Osaka (JP)

(72) Inventors: Masamichi Ohara, Fukuoka (JP); Takamasa Yokoyama, Fukuoka (JP); Kazuki Yoshino, Osaka (JP); Yoshio Sakakibara, Osaka (JP); Yoichiro Yamagi, Fukuoka (JP); Hironori Kuribayashi, Fukuoka (JP); Yoshihito Urashima, Fukuoka (JP); Jyouji Wada, Fukuoka (JP); Shinichiro Okamura, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 53 days.

(21) Appl. No.: 15/428,560

(22) Filed: Feb. 9, 2017

(65) Prior Publication Data
US 2017/0230580 A1    Aug. 10, 2017

(30) Foreign Application Priority Data
Feb. 10, 2016 (JP) .................. 2016-023838

(51) Int. Cl.
*H04N 5/232* (2006.01)
*G03B 17/56* (2006.01)
(Continued)

(52) U.S. Cl.
CPC ....... *H04N 5/23267* (2013.01); *G03B 17/561* (2013.01); *G08B 13/1963* (2013.01); *H04N 5/2252* (2013.01); *H04N 5/2256* (2013.01); *H04N 5/23245* (2013.01); *H04N 5/23258* (2013.01); *H04N 5/23296* (2013.01);
(Continued)

(58) Field of Classification Search
CPC ............ H04N 5/23267; H04N 5/2628; G08B 13/1963; G03B 17/561
See application file for complete search history.

(56) References Cited

U.S. PATENT DOCUMENTS

| | | | |
|---|---|---|---|
| 9,628,688 B2* | 4/2017 | Martin | .................... G01P 15/00 |
| 2006/0098092 A1* | 5/2006 | Park | ....................... H04N 7/183 |
| | | | 348/143 |

(Continued)

FOREIGN PATENT DOCUMENTS

| | | |
|---|---|---|
| JP | 2005-094080 | 4/2005 |
| JP | 2007-134784 | 5/2007 |

(Continued)

*Primary Examiner* — Nam D Pham
(74) *Attorney, Agent, or Firm* — Greenblum & Bernstein, P.L.C.

(57) ABSTRACT

A monitoring camera sets ON or OFF of swing correction in accordance with setting information about whether or not the swing correction of an image (that is, captured image) captured by an image sensor is performed, and corrects swing by cutting out a part of the captured image based on a swing detected value of a vibration sensor in a case where the swing correction is set ON. The monitoring camera outputs the captured image while maintaining a state thereof in a case where the swing correction is set OFF.

7 Claims, 11 Drawing Sheets

(51) Int. Cl.
  *H04N 5/225*  (2006.01)
  *H04N 5/262*  (2006.01)
  *H04N 7/18*  (2006.01)
  *G08B 13/196*  (2006.01)
  *G03B 17/02*  (2006.01)

(52) U.S. Cl.
  CPC ........... *H04N 5/2628* (2013.01); *H04N 7/183* (2013.01); *G03B 17/02* (2013.01); *G03B 2217/005* (2013.01); *H04N 5/23261* (2013.01)

(56) References Cited

U.S. PATENT DOCUMENTS

| | | | |
|---|---|---|---|
| 2008/0122927 | A1 | 5/2008 | Konno et al. |
| 2012/0147181 | A1* | 6/2012 | Duner .................... G03B 17/02 |
| | | | 348/143 |
| 2014/0043478 | A1 | 2/2014 | Burton |
| 2014/0211004 | A1 | 7/2014 | Konno et al. |

FOREIGN PATENT DOCUMENTS

| | | |
|---|---|---|
| JP | 2007-235416 | 9/2007 |
| JP | 2009-081607 | 4/2009 |
| JP | 2009-139827 | 6/2009 |
| JP | 2015-114358 | 6/2015 |
| JP | 1534280 | 10/2015 |

\* cited by examiner

FIG. 8A
| SWING ANGLE | IMAGE SHIFT AMOUNT | PAN MOTOR ROTATION AMOUNT | TILT MOTOR ROTATION AMOUNT |
|---|---|---|---|
| ⋮ | ⋮ | ⋮ | ⋮ |
FIG. 8B
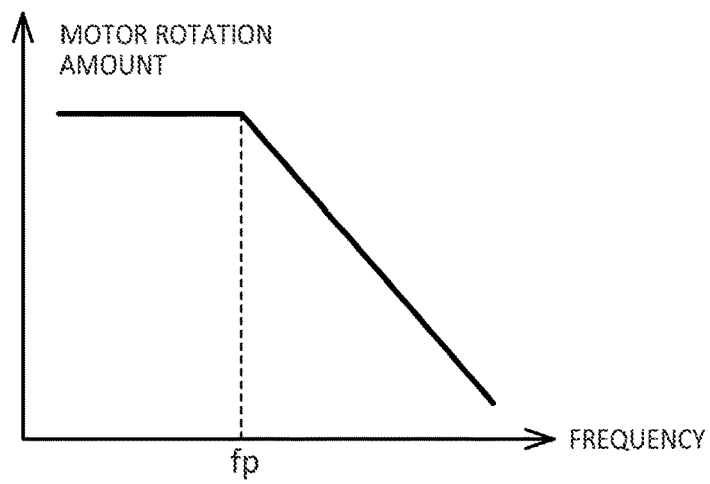
FIG. 8C
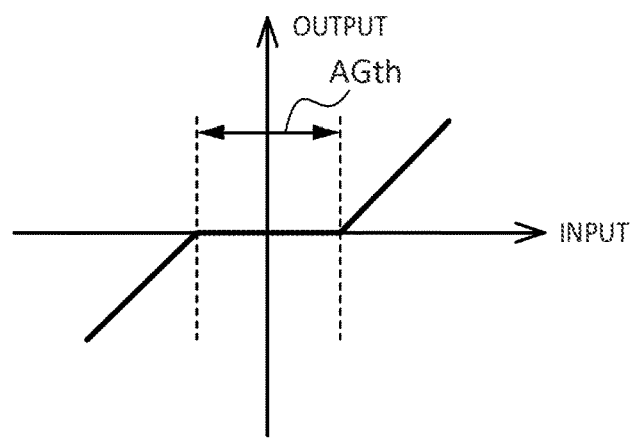

| SWING ANGLE | LENS SHIFT AMOUNT | PAN MOTOR ROTATION AMOUNT | TILT MOTOR ROTATION AMOUNT |
|---|---|---|---|
|  |  |  |  |
| ⋮ | ⋮ | ⋮ | ⋮ |

MONITORING CAMERA AND SWING CORRECTION METHOD

CROSS REFERENCE TO RELATED APPLICATIONS

This application is based on Japanese Patent Application (No. 2016-023838) filed on Feb. 10, 2016, the contents of which are incorporated herein by reference.

BACKGROUND OF THE INVENTION

1. Field of the Invention

The disclosure relates to a monitoring camera and an image processing method.

2. Description of the Related Art

In the related art, a camera illuminating apparatus which controls light distribution of illumination in accordance with zoom magnification of a camera, is known (for example, refer to JP-A-2007-134784). The camera illuminating apparatus includes an illuminating device which emits light with respect to a photographing range of a camera; illuminating head-oscillating means for relatively changing an illuminating direction of the illuminating device with respect to a photographing direction of the camera; and head-oscillating control means for controlling the illuminating head-oscillating means so as to change a light-emitting direction of the illuminating device in accordance with a zoom operation of the camera.

In the camera illuminating apparatus described in JP-A-2007-134784, the light-emitting direction of the illumination changes in accordance with the zoom magnification of the camera, but swing correction of the camera is not considered. Therefore, in a case of performing the swing correction of the camera, the light distribution is deviated in a cut-out range of an image, and there is a case where an image quality deteriorates.

SUMMARY OF THE INVENTION

Considering the above-described situation, the disclosure provides a monitoring camera and an image processing method which can reduce deviation of light distribution in a cut-out range of an image, and can improve an image quality even in a case of correcting swing of a camera.

The disclosure provides a monitoring camera which is installed at a place at which swing is generated in a fixed surface itself, the monitoring camera including: a body housing configured to be fixed to the fixed surface; a vibration sensor that detects swing of the monitoring camera; an image sensor that captures an image; and a processor that performs swing correction by cutting out a part of the image captured by the image sensor based on a detected value of the vibration sensor, in which the processor sets ON or OFF of the swing correction in accordance with setting information about whether or not the swing correction is performed, and outputs the image captured by the image sensor when the setting information indicates that the swing correction is set to OFF, and in which the processor sets ON or OFF of the swing correction in accordance with a remote operation.

In addition, the disclosure provides a monitoring camera which is capable of performing pan rotation and tilt rotation, the monitoring camera including: a capturing portion that captures an image; a sensor that detects swing of the monitoring camera; a swing correction amount calculating portion that calculates a correction amount of the swing of the image captured by the capturing portion, based on a swing detected value of the sensor; a rotation control portion that generates a control signal for performing at least one of the pan rotation and the tilt rotation to reduce the swing of the monitoring camera, based on the swing detected value of the sensor; a swing correction portion that performs swing correction of the image in accordance with the correction amount calculated by the swing correction amount calculating portion; and a rotation mechanism portion that performs at least one of the pan rotation and the tilt rotation in accordance with the control signal generated by the rotation control portion.

In addition, the disclosure provides a swing correction method used in a monitoring camera being capable of performing pan rotation and tilt rotation, the swing correction method including: capturing an image by a capturing portion; detecting swing of the monitoring camera by a sensor; generating a control signal for performing at least one of the pan rotation and the tilt rotation to reduce the swing of the monitoring camera based on a swing detected value of the sensor; performing at least one of the pan rotation and the tilt rotation by a rotation mechanism portion in accordance with the generated control signal; calculating a correction amount of the swing of the image captured by the capturing portion based on the swing detected value of the sensor by the processor; and performing swing correction of the image by the processor in accordance with the calculated correction amount.

According to the disclosure, even in a case of correcting the swing of the camera, it is possible to reduce the deviation of light distribution in the cut-out range of the image, and to improve the image quality.

BRIEF DESCRIPTION OF THE DRAWINGS

FIG. 8A is a view illustrating a first example of a swing angle conversion table.

FIG. 8B is an explanation view illustrating an example of an operation outline of a high-frequency removing processing portion.

FIG. 8C is an explanation view illustrating an example of an operation outline of a signal coring processing portion.

DETAILED DESCRIPTION OF THE EXEMPLARY EMBODIMENTS

Hereinafter, the embodiment will be described in detail with reference to the appropriate drawings. However, there is a case where description which is more detail than needed is omitted. For example, there is a case where detail description of situation that is already well known or overlapping description of substantially the same configuration is omitted. This is for avoiding unnecessary lengthy description and for making it easy to understand for those skilled in the art. Furthermore, the attached drawings and the following description are provided for making it sufficient to understand the disclosure for those skilled in the art, and accordingly, do not intend to limit the theme described in the range of patent claims.

Details Until Obtaining One Aspect of Disclosure

A capturing device which has a swing correction function for reducing blurring of an image caused by vibration or the like, is known. When the swing correction function is added to a camera adjusting apparatus of JP-A-2007-134784, in a case where the swing correction is performed being interlocked with zooming of a camera lens in a state where a light source lens is also zoomed, light condensed by the zooming becomes ununiform in accordance with a range obtained by cutting out the image in the swing correction, and visibility of the image deteriorates.

Hereinafter, a monitoring camera and an image processing method which can reduce deviation of light distribution in an image, and can improve an image quality even in a case of correcting swing of a camera, will be described.

First Embodiment

Configuration or the Like

Figure 1:
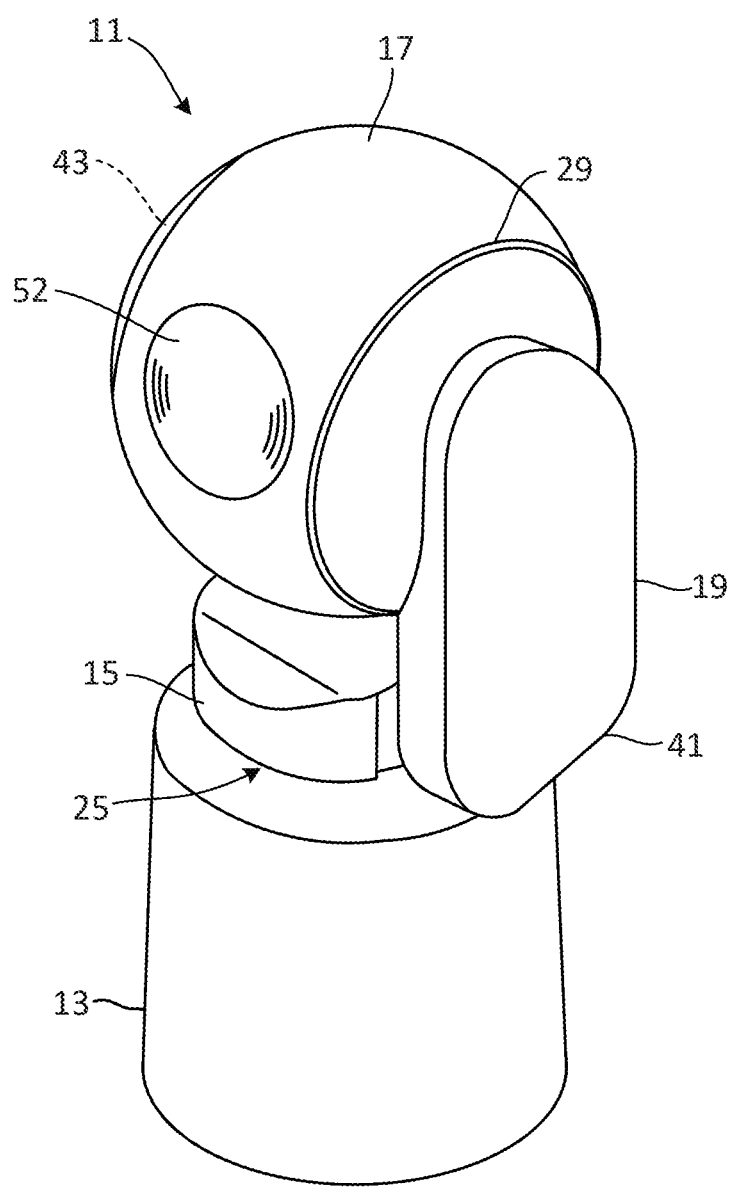
FIG. 1 is a perspective view of an external appearance illustrating an example of a monitoring camera according to a first embodiment.
Figure 2A:
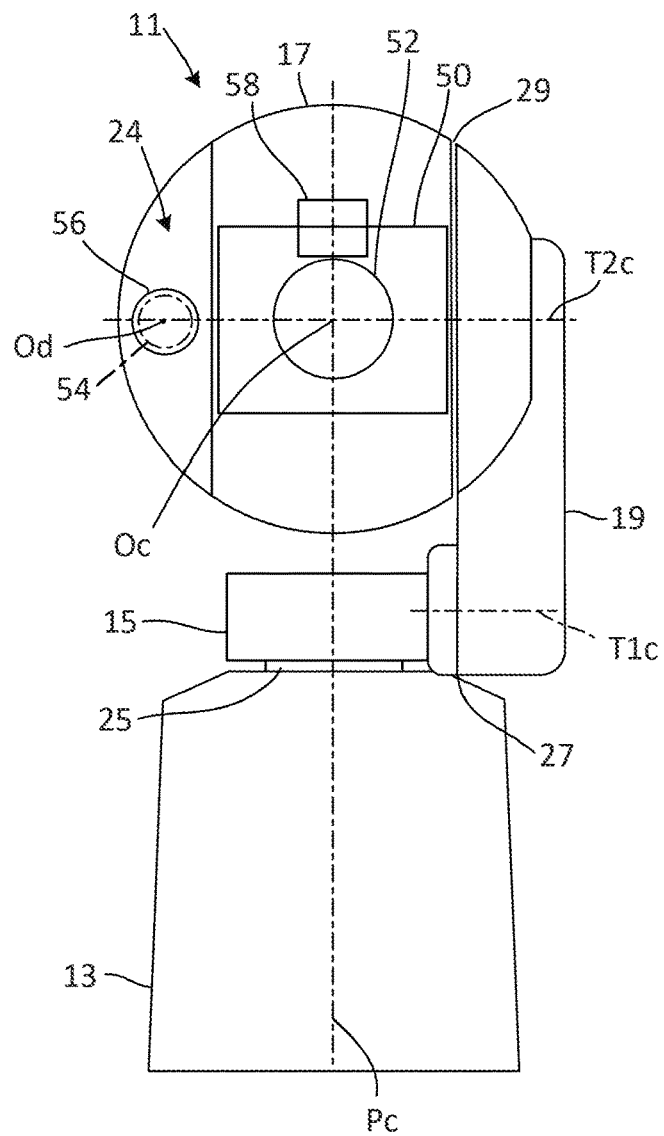
FIG. 2A is a front view illustrating an example of the monitoring camera.

FIG. 1 is a perspective view of an external appearance illustrating an example of a monitoring camera 11 according to a first embodiment. FIG. 2A is front view illustrating an example of the monitoring camera 11.

The monitoring camera 11 includes a body housing 13, a pan housing 15, and a tilt housing 17. The body housing 13 is an attaching stand, and a lower surface (surface on a lower side in FIG. 1) is an attaching surface. The body housing 13 is formed, for example, in a substantially columnar shape of which the attaching surface side has a diameter slightly greater than that on the opposite side. In the monitoring camera 11, the attaching surface of the body housing 13 is fixed to a fixed surface by a fastener, such as a bolt.

A supporting arm 19 is attached to the pan housing 15. The pan housing 15 is supported to be freely pan-rotatable around a pan axis Pc on an upper surface of the body housing 13. The pan axis Pc matches an axial line of the body housing 13. The pan housing 15 supports one base end of the supporting arm 19 on one end side thereof. In other words, the supporting arm 19 pan-rotates integrally with the pan housing 15. The pan housing 15 supports the base end of the supporting arm 19 to be freely rotatable by a first tilt axis T1c which is separated from and intersects with the pan axis Pc at a right angle. In other words, the supporting arm 19 can be tilted around the first tilt axis T1c. The supporting arm 19 rises from the pan housing 15 and supports the tilt housing 17 at a tip end.

A tilt housing 17 is formed, for example, in a substantially spherical shape. In the tilt housing 17, a part of the spherical shape is removed. At the part, the tip end of the supporting arm 19 is disposed. In the tilt housing 17, one end in a diameter direction is supported to be freely tilt-rotatable around a second tilt axis T2c parallel to the first tilt axis T1c, at the tip end of the supporting arm 19. The second tilt axis T2c passes through the spherical center of the tilt housing 17. The tilt housing 17 is separated from the pan housing 15 from above, and is supported by the supporting arm 19. In other words, the tilt housing 17 can tilt-rotate by two axes between the first tilt axis T1c and the second tilt axis T2c of upper and lower ends of the supporting arm 19. Accordingly, the tilt housing 17 can be lifted (move in a direction of being separated from the pan axis Pc) from the pan housing 15.

The tilt housing 17 accommodates an image sensor 50 (refer to FIG. 2A) which is an example of a capturing portion on the inside thereof. The capturing portion includes an optical system, such as a lens (for example, refer to FIG. 2A or 10B), and a capturing unit including the image sensor 50. The image sensor 50 is disposed such that the center of a capturing surface (that is, a light-receiving surface) matches an optical axis Oc of a zoom lens 52 orthogonal to the second tilt axis T2c. The zoom lens 52 is disposed on a front surface of the image sensor 50, and can change zoom magnification. The image sensor 50 and the zoom lens 52 are covered with cover glass provided in the tilt housing 17.

In addition, although not being illustrated, in the tilt housing 17, various electronic devices are accommodated. Examples of the electronic devices include a central processing unit (CPU), a digital signal processor (DSP), various controllers, and various actuators.

The monitoring camera 11 has an illumination space 24 in the tilt housing 17. The illumination space 24 accommodates a light emitting diode (LED) 54 which illuminates the capturing range by the image sensor 50.

The illumination space 24 is provided on a side opposite to the supporting arm 19 nipping the image sensor 50, that is, on a side opposite to the image sensor 50 nipping a surface orthogonal to the second tilt axis T2c. On the front surface of the LED 54, an LED lens 56 is disposed such that an optical axis Od matches a light-emitting optical path of the LED 54. The LED lens 56 can change light condensing rate. The LED 54 and the LED lens 56 are covered with cover glass provided in the illumination space 24 of the tilt housing 17.

In the monitoring camera 11, a part between the body housing 13 and the pan housing 15 is a pan rotation portion 25. A part between the pan housing 15 and the supporting arm 19 is a first tilt rotation portion 27. A part between the supporting arm 19 and the tilt housing 17 is a second tilt rotation portion 29.

Data transmission of capturing information or a control signal of a motor in the pan rotation portion 25, the first tilt rotation portion 27, and the second tilt rotation portion 29 is performed, for example, by non-contact power line communication (PLC) using an antenna.

In addition, in the monitoring camera 11, transmission of power in the pan rotation portion 25 is performed, for example, by a slip ring. In addition, the transmission of power in the first tilt rotation portion 27 and the second tilt rotation portion 29 is performed, for example, by a distortion line.

In the monitoring camera 11, the pan rotation portion 25, the first tilt rotation portion 27, and the second tilt rotation portion 29 have a watertight structure. The pan rotation portion 25, the first tilt rotation portion 27, and the second tilt rotation portion 29 configure, for example, a waterproof structure as a void between the axis and a bearing is blocked by a waterproof material that comes into contact with both thereof. Accordingly, the monitoring camera 11 can be employed for outdoor specification without being covered with a dome cover.

In addition, in the supporting arm 19, the front side on which the first tilt axis T1c is disposed is hanging on a rear side (refer to FIG. 1). In other words, the supporting arm 19 has an inclined surface 41 in the direction of being separated from the pan housing 15, from a position at which the first tilt axis T1c is disposed, at a lower end portion. The supporting arm 19 of the monitoring camera 11 can rotate (rearward tilting) in the direction in which the inclined surface 41 approaches the pan housing 15 by providing the inclined surface 41. In other words, by having the inclined surface 41, the supporting arm 19 suppresses interference with the pan housing 15 during the rearward tilting.

In addition, the monitoring camera 11 has an auxiliary machine additional installation space 43 in the tilt housing 17. The auxiliary machine additional installation space 43 is provided on a side opposite to the supporting arm 19 nipping a camera 23, that is, on a side opposite to the camera 23 nipping the surface orthogonal to the second tilt axis T2c.

In addition, as will be described later, in the monitoring camera 11 installed at a place at which the fixed surface itself to which the body housing 13 is fixed swings (that is, vibrates), a gyro sensor 58 (refer to FIG. 2A) for detecting the swing of the monitoring camera 11 is provided.

Figure 2B:
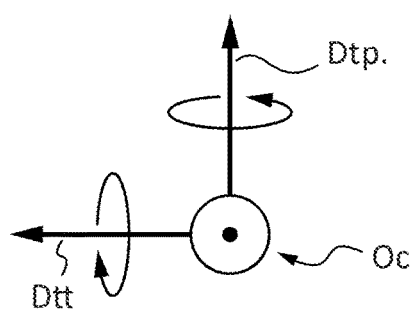
FIG. 2B is an explanation view illustrating an example of a relationship between an optical axis and a detection axis of a gyro sensor.

FIG. 2B is an explanation view illustrating an example of a relationship between the optical axis Oc and the detection axes Dtp and Dtt of the gyro sensor 58.

Specifically, the gyro sensor 58 is disposed such that a starting point (that is, an intersecting point of the detection axis Dtp for detecting the swing in a pan direction and the detection axis Dtt for detecting the swing in a tilt direction) of the detection axis of the swing of the monitoring camera 11 in the gyro sensor 58 is positioned (that is, overlaps), in the direction of the optical axis Oc of the zoom lens 52 which is an example of the capturing portion. For example, as illustrated in FIG. 2A, the gyro sensor 58 is disposed immediately above the zoom lens 52. In addition, the gyro sensor 58 may be disposed immediately behind the image sensor 50. Accordingly, since the gyro sensor 58 is disposed at a position of swinging integrally with the optical system of the monitoring camera 11, in accordance with the swing generated in the monitoring camera 11, it is possible to accurately detect the swing that matches a swing amount of the image captured by the image sensor 50.

Figure 3:
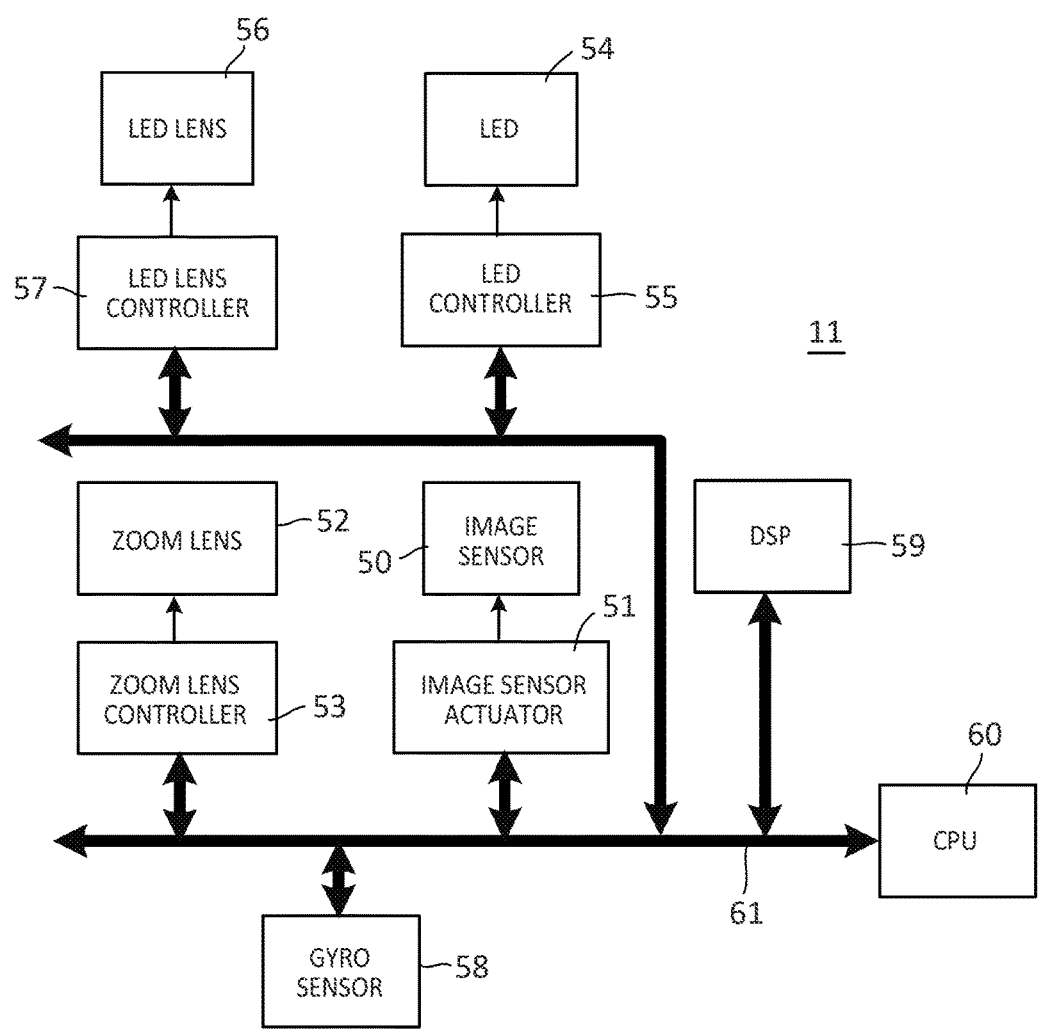
FIG. 3 is a block diagram illustrating an example of a hardware configuration of the monitoring camera.

FIG. 3 is a block diagram illustrating an example of a hardware configuration of the monitoring camera 11.

The monitoring camera 11 includes the image sensor 50, an image sensor actuator 51, the zoom lens 52, a zoom lens controller 53, the LED 54, an LED controller 55, the LED lens 56, an LED lens controller 57, the gyro sensor 58, a DSP 59, a CPU 60, and a memory 62.

The image sensor actuator 51, the zoom lens controller 53, the LED controller 55, the LED lens controller 57, the gyro sensor 58, the DSP 59, the CPU 60, and the memory 62 are connected to each other through a bus 61.

The image sensor 50 captures an image. In other words, the image sensor 50 forms an image on a sensor light-receiving surface using reflected light reflected by an object, and converts light and shade of the light of the formed image into an electric signal. In addition, the image sensor 50 performs the converted electric signal, generates an image signal for each frame, and outputs the signal to the DSP 59. The image includes a still image or a moving image. The frame rate is, for example, 60 frame per second (fps).

The image sensor 50 includes, for example, a charge coupled device (CCD) or a complementary metal oxide semiconductor (CMOS).

The image sensor actuator 51 supplies various timing signals necessary for driving the image sensor 50, to the image sensor 50.

The zoom lens 52 is a lens of which the zoom magnification is variable by the control of the zoom lens controller 53, and is disposed on the front surface of the image sensor 50.

The zoom lens controller 53 has a motor mechanism (not illustrated) that moves the zoom lens 52 in forward and rearward directions along the light-emitting optical path. The zoom lens controller 53 varies the zoom magnification by controlling the motor mechanism in accordance with an instruction from the CPU 60.

For example, in a case of a TELE mode for increasing the size of the object, the zoom lens controller 53 elongates the distance between the image sensor 50 and the zoom lens 52 (that is, elongates a focal length), increases the zoom magnification, and reduces an angle of view by projecting the captured target to be large (that is, narrow the capturing range).

In addition, in a case of a WIDE mode for reducing the size of the object, the zoom lens controller 53 shortens the distance between the image sensor 50 and the zoom lens 52 (that is, shortens a focal length), reduces the zoom magnification, and increases an angle of view by projecting the captured target to be small (that is, widens the capturing range).

The LED 54 illuminates the capturing range by the image sensor 50, by the control of the LED controller 55. The illumination light may be, for example, infrared light or visible light. Furthermore, in FIG. 11, the monitoring camera 11 includes one LED 54, but is not limited to the number of the LEDs 54, and the number may be arbitrary. For example, in a case where a quantity of light is not sufficient by one LED 54, plural (for example, six) numbers of LEDs 54 may be provided.

The LED controller 55 controls turning-on, turning-off, and adjusting of light of the LED 54 in accordance with an instruction of the CPU 60.

The LED lens 56 is a lens of which the light condensing rate is variable, and is disposed on the front surface of the LED 54 in the illumination space 24, by the control of the LED lens controller 57. Furthermore, in a case where the plurality of LEDs 54 are provided in the monitoring camera 11, the same number of LED lenses 56 as that of the LEDs 54 may be provided and the LED lenses 56 may be disposed on the front surfaces of each of the LEDs 54. One LED lens 56 may be provided with respect to the plurality of LEDs 54. For example, one LED lens 56 may be provided with respect to three LEDs 54.

The LED lens controller 57 includes a motor mechanism (not illustrated) that moves the LED lens 56 in forward and rearward directions along the light-emitting optical path. In the LED lens controller 57, the light condensing rate varies by controlling the motor mechanism in accordance with an instruction from the CPU 60.

Figure 4A:
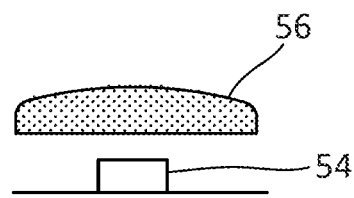
FIG. 4A is schematic view illustrating an example of a positional relationship between an LED and an LED lens in the monitoring camera.
Figure 4B:
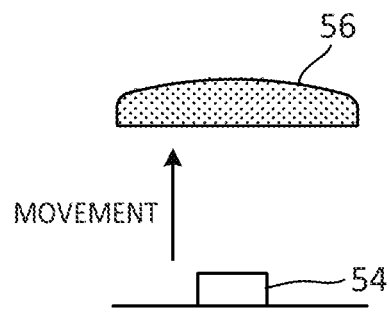
FIG. 4B is schematic view illustrating an example of a positional relationship between the LED and the LED lens in the monitoring camera.

FIGS. 4A and 4B are schematic views illustrating an example of a positional relationship between the LED 54 and the LED lens 56 in the monitoring camera 11. FIG. 4A illustrates a position of the LED lens 56 in a WIDE mode, and FIG. 4B illustrates a position of the LED lens 56 in a TELE mode.

For example, in the TELE mode for emitting the light flux to a far side, the LED lens controller 57 elongates the distance between the LED 54 and the LED lens 56 (that is, elongates the focal length), increases the light condensing rate, and narrows the illumination range.

In addition, in the WIDE mode for emitting the light flux to a near side, the LED lens controller 57 shortens the distance between the LED 54 and the LED lens 56 (that is, shortens the focal length), reduces the light condensing rate, and widens the illumination range.

The gyro sensor 58 detects the swing (for example, vibration of the image sensor 50) of the monitoring camera 11 itself. The detection of the vibration of the image sensor 50 includes, for example, the presence or absence of the vibration of the image sensor 50 and the width of the vibration (swing width). The gyro sensor 58 detects the swing in the pan direction (that is, the direction of the pan rotation) along the detection axis Dtp illustrated in FIG. 2B, and further detects the swing in the tilt direction (that is, the direction of the tilt rotation) along the detection axis Dtt illustrated in FIG. 2B. In addition, the gyro sensor 58 may detect each of the swing in the pan direction and the swing in the tilt direction using one device, or may detect each of the swing in the pan direction and the swing in the tilt direction by each of the devices using two devices.

It is possible to detect the swing of the attached monitoring camera 11 at various places, by the gyro sensor 58. For example, the largest swing is detected when the gyro sensor 58 is attached to a ship, and then, large swing is detected when the gyro sensor 58 is attached to a power cable or a monitoring camera prop.

The DSP 59 takes in an image signal obtained by the image sensor 50, and performs various types of image processing. The DSP 59 performs swing correction, for example, based on the detected value obtained by the gyro sensor 58. In the swing correction, the DSP 59 does not change the capturing range by the image sensor 50, and changes a range in which the image is cut out from the captured image (a position at which the image is cut out).

The CPU 60 controls each portion, such as the image sensor actuator 51, the zoom lens controller 53, the LED controller 55, the LED lens controller 57, and the DSP 59.

The CPU 60 operates following a program written into the memory 62. The memory includes, for example, a random access memory (RAM) or a read only memory (ROM). The memory may be embedded in the CPU 60, or may be provided outside the CPU 60. The CPU 60 can change processing contents by changing the program. The memory 62 includes a semiconductor memory (for example, flash memory), for example, for storing and holding data generated by the CPU 60 even in a case where the power source of the monitoring camera 11 is OFF.

The CPU 60 may interlock with the TELE/WIDE modes of the zoom lens 52 and control the TELE/WIDE modes of the LED lens 56, via the LED lens controller 57. In other words, the LED lens controller 57 may interlock with the zoom magnification of the zoom lens 52 and control light condensing rate of the LED lens 56.

In this case, in a case of increasing the zoom magnification, the CPU 60 moves the zoom lens 52 in the direction of being separated from the image sensor 50, moves the LED lens 56 in the direction of being separated from the LED 54, and increases light condensing rate. In addition, in a case of reducing the zoom magnification, the CPU 60 moves the zoom lens 52 in the direction of approaching the image sensor 50, moves the zoom lens 52 in the direction of approaching the image sensor 50, moves the LED lens 56 in the direction of approaching the LED 54, and reduces the light condensing rate.

The CPU 60 may control the light condensing rate of the LED lens 56 without being interlocked with the zoom magnification of the zoom lens 52.

The CPU 60 is interlocked with the swing correction by the DSP 59 via the LED lens controller 57, and controls the light condensing rate of the LED lens 56. The control of the light condensing rate interlocked with the swing correction is also referred to as "correction-interlocked light condensing control".

Next, the correction-interlocked light condensing control will be described in detail. Here, a first control example to a third control example of the correction-interlocked light condensing control will be described as examples. Whether or not the CPU 60 performs any of the first control example to the third control example of the correction-interlocked light condensing control may be arbitrarily set via a user interface (UI) which is not illustrated, or may be set in the CPU 60 based on a predetermined condition.

First Control Example

In the first control example, setting information about whether or not the swing correction is performed by the DSP 59 is held in the memory. The setting information includes any of the information that makes the swing correction function efficient (swing correction is set ON) and the information that makes the swing correction function inefficient (swing correction is set OFF).

The swing correction ON/OFF may be set, for example, via a switch or the like which is not illustrated, or may be set by a remote operation.

In a case of the swing correction OFF, the CPU 60 sets the distance between the LED 54 and the LED lens 56 to be a first distance, and sets the light condensing rate of the LED lens 56 to be first light condensing rate. In a case of the swing correction ON, the CPU 60 sets the distance between the LED 54 and the LED lens 56 to be a second distance, and sets the light condensing rate of the LED lens 56 to be second light condensing rate. Here, at the same zoom magnification as that of the zoom lens 52, the second distance becomes shorter than the first distance, and the second light condensing rate becomes smaller than the first light condensing rate. Accordingly, regarding the illumination range, the illumination range widens by the LED 54 to be wider than the capturing range by the image sensor 50.

According to the first control example, the monitoring camera 11 can suppress a situation in which the image is unlikely to be seen as a location against which the illumination abuts and a location against which the illumination does not abut are included in the image cut out by the swing correction even in a case of the swing correction ON.

Second Control Example

In the second control example, the CPU 60 controls the distance between the LED 54 and the LED lens 56, controls the light condensing rate, and controls the illumination range, in accordance with the swing width of the image cut out by the swing correction. The swing width of the cut-out image corresponds to the detected value (value of the swing width) detected by the gyro sensor 58.

For example, correction data (for example, graphed data) indicating a relationship between the detected value (for example, the swing width) by the gyro sensor 58 and the distance between the LED 54 and the LED lens 56 or the light condensing rate with respect to the detected value, is held in the memory. The CPU 60 may control the distance between the LED 54 and the LED lens 56 or the light condensing rate based on the correction data.

The CPU 60 reduces the light condensing rate of the LED lens 56 at the same zoom magnification as the swing width of the monitoring camera 11 increases. The CPU 60 may increase the light condensing rate of the LED lens 56 in the same zoom magnification as the swing width of the monitoring camera 11 decreases.

According to the second control example, in the monitoring camera 11, the light condensing rate of the LED lens 56 can be variable and the illumination range can be variable in accordance with the correction amount of the swing correction. Therefore, the monitoring camera 11 can suppress deterioration of visibility of the image while maintaining the light condensing rate as much as possible, that is, while maintaining the image as bright as possible compared to a case where the illumination range uniformly changes. In addition, the monitoring camera 11 can perform light condensing control with high trackability with respect to the swing correction.

Third Control Example

In the third control example, the CPU 60 controls the distance between the LED 54 and the LED lens 56, controls the light condensing rate, and controls the illumination range, in accordance with a statistic value of the swing width of the image cut out by the swing correction.

The statistic value may be, for example, a value obtained by averaging an absolute value of the detected value of the gyro sensor 58, or may be other statistic values. For example, in a case of 60 fps, the CPU 60 calculates an average value of the swing width (absolute value of the detected value) of the monitoring camera 11 for three seconds. The CPU 60 may control the light condensing rate at the same zoom magnification based on the statistic value.

According to the third control example, in a case where it is difficult to set the illumination range by the LED 54 following the swing correction, the monitoring camera 11 can appropriately control the light condensing rate of the LED lens 56. In addition, by using the statistic value, a motor mechanism which drives the LED lens 56 with high accuracy is not necessary. Therefore, low costs of the monitoring camera 11 can be achieved.

Furthermore, in any of the first control example to the third control example, the zoom magnification of the zoom lens 52 and the light condensing rate of the LED lens 56 may be interlocked with each other. In this case, the CPU 60 controls the distance between the LED 54 and the LED lens 56, controls the light condensing rate, and controls the illumination range to include the range of the image cut out by the swing correction.

Next, a specific example of the cut-out range of the image by the swing correction and the illumination range of the LED 54 will be described.

Figure 5A:
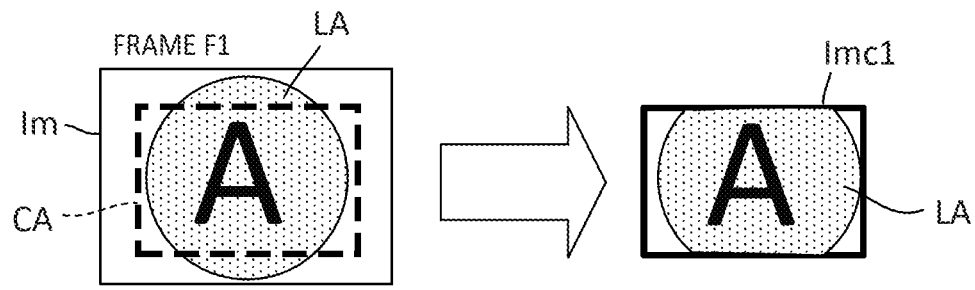
FIG. 5A is a schematic view illustrating an example of a cut-out range and an illumination range of an image in a comparative example.
Figure 5B:
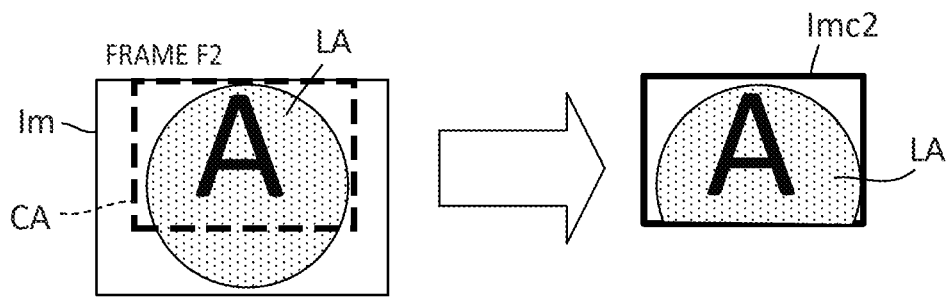
FIG. 5B is a schematic view illustrating an example of the cut-out range and the illumination range of the image in the comparative example.
Figure 5C:
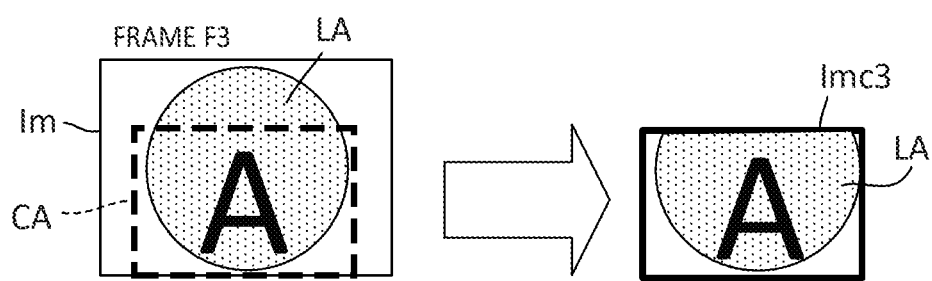
FIG. 5C is a schematic view illustrating an example of the cut-out range and the illumination range of the image in the comparative example.

FIGS. 5A, 5B, and 5C are schematic views illustrating an example of a cut-out range and an illumination range of the image in comparative example. In FIGS. 5A, 5B, and 5C, the correction-interlocked light condensing control is not performed, that is, the swing correction is performed, but it is assumed that the light condensing control interlocked with the swing correction is not performed.

The DSP 59 sets a cut-out range CA by the swing correction and generates a cut-out image Imc (Imc1, Imc2, Imc3, . . . ), with respect to each of captured images Im of frames F1 to F3. The captured image Im is an image captured by the image sensor 50.

In the swing correction, the position of the cut-out range CA in the captured image Im changes following the swing of the monitoring camera 11. Therefore, in each of the cut-out images Imc (Imc1, Imc2, Imc3, . . . ), it is seen that the position of a character "A" does not change.

An illumination range LA is included in the captured image Im before the swing correction. The position of "A" in the captured image Im changes in accordance with the swing of the monitoring camera 11. Meanwhile, in the cut-out image Imc (Imc1, Imc2, Imc3, . . . ) after the swing correction, the illumination range LA is not interlocked with the swing correction, and thus, the position of the illumination range LA in the cut-out image Imc (Imc1, Imc2, Imc3, . . . ) varies.

For example, in the cut-out image Imc1, the LED 54 is illuminated around "A", but a part around four corners of the cut-out image Imc1 is not illuminated. In addition, in the cut-out image Imc2, the LED 54 performs illumination around a lower part of "A", but an upper part of "A" is not illuminated. In the cut-out image Imc3, the LED 54 illuminates a part around the upper part of "A", but the lower part of "A" is not illuminated.

Accordingly, when displaying the cut-out image Imc (Imc1, Imc2, Imc3, . . . ), the illumination range LA changes in each frame in the cut-out image Imc, and thus, visibility of the cut-out image Imc (Im1, Imc2, Imc3, . . . ) is not sufficient.

Furthermore, in a case of the swing correction OFF in the embodiment, the swing correction is not performed, and thus, the cut-out image Imc (Imc1, Imc2, Imc3, . . . ) is not generated, but each of the captured images Im and the illumination range LA are the same in FIGS. 5A, 5B, and 5C.

Figure 6A:
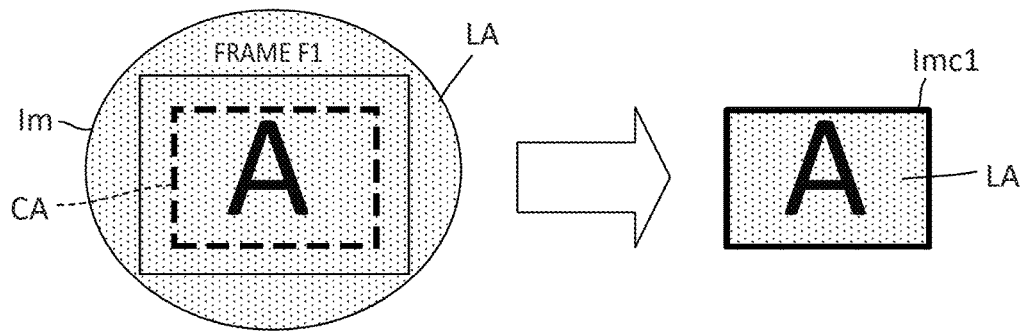
FIG. 6A is a schematic view illustrating an example of a cut-out range and an illumination range of the image in the first embodiment.
Figure 6B:
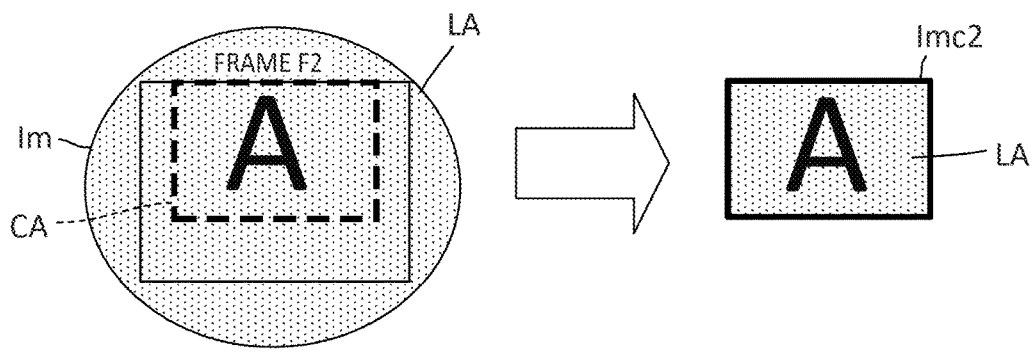
FIG. 6B is a schematic view illustrating an example of the cut-out range and the illumination range of the image in the first embodiment.
Figure 6C:
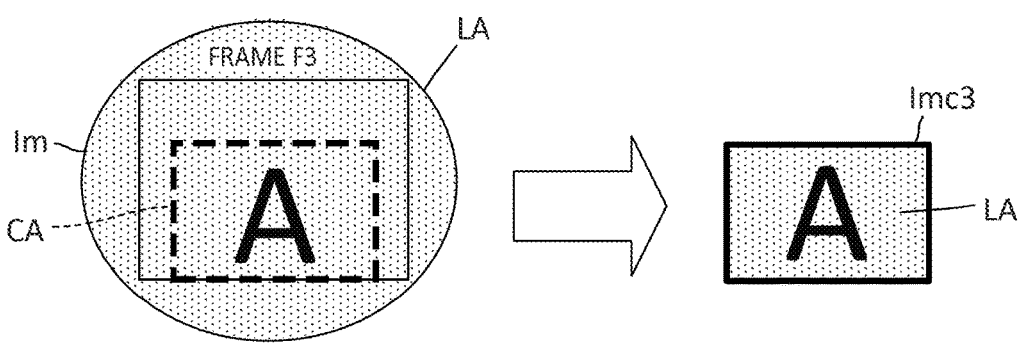
FIG. 6C is a schematic view illustrating an example of the cut-out range and the illumination range of the image in the first embodiment.

FIGS. 6A, 6B, and 6C are schematic views illustrating an example of the cut-out range and the illumination range of the image in the first embodiment. In FIGS. 6A, 6B, and 6C, a case where the swing correction is set ON in the first control example, is illustrated as an example.

The illumination range LA is set to be wider than that in a case where the correction-interlocked light condensing control is not performed or a case of the swing correction OFF and includes the entire region of the size of the captured image Im of each of the frames F1, F2, and F3. The position of "A" in the captured image Im changes in accordance with the swing of the monitoring camera 11, but at any timing, the illumination range LA is in a state of including the entire captured image Im.

In other words, in any of the cut-out images Imc1 to Imc3, the brightness of the entire image is substantially uniform, and deterioration of visibility is suppressed. Accordingly, the monitoring camera 11 can suppress brightening of the center portion of the cut-out image Imc (Imc1 Imc2, Imc3 . . . ) compared to the end portion.

Effects or the Like

In this manner, the monitoring camera 11 includes the image sensor 50 which captures an image; the zoom lens 52 which is disposed on the front surface of the image sensor 50, and of which the zoom magnification is variable; a light source which illuminates the capturing range by the image sensor 50; a light source lens which is disposed on the front surface of the light source, and of which the light condensing rate is variable; and a processor which cuts out a specific range in the image by the swing correction of the image sensor 50, and controls the zoom magnification and the light condensing rate. The processor reduces the light condensing rate at the same zoom magnification to be smaller than that in a case where the swing correction of the image sensor 50 is not performed, in a case of performing the swing correction of the image sensor 50.

The light source is, for example, the LED 54. The light source lens is, for example, the LED lens 56. The processor includes, for example, the DSP 59 or the CPU 60.

Accordingly, since the monitoring camera 11 interlocks with the swing correction and controls the light condensing rate of the light source lens, as the illumination also swings due to the light source together with the swing of the monitoring camera 11, it is possible to reduce ununiformity of illumination within the cut-out range of the image. Accordingly, in a case where the monitoring camera 11 performs the swing correction of the image sensor 50, the deviation of the light distribution in the image is reduced, and the image quality can be improved.

In addition, the monitoring camera 11 may be provided with a vibration sensor which detects the vibration of the image sensor 50. The processor may control the light condensing rate at the same zoom magnification in accordance with the detected value by the vibration sensor. The vibration sensor is, for example, the gyro sensor 58.

Accordingly, it is possible to improve the trackability of the light condensing rate of the optical lens with respect to the correction amount of the swing correction. Accordingly, the monitoring camera 11 suppresses deterioration of the illumination strength in the cut-out range of the image, and can generate the image having a small amount of blur by the swing correction.

In addition, the processor may control the light condensing rate at the same zoom magnification based on the statistic value of the detected value by the vibration sensor.

Accordingly, in a case where it is difficult to accurately follow the light condensing rate of the light source lens with respect to the correction amount of the swing correction, the monitoring camera 11 can suppress deterioration of the visibility of the cut-out range of the image. In addition, the motor mechanism which drives the light source lens with high accuracy is not necessary.

In addition, in an image processing method of the embodiment, when the swing correction of the image sensor 50 is not performed, the capturing range is illuminated by the light source by the image sensor 50 using the light source lens disposed on the front surface of the light source as the first light condensing rate, the first image is captured by the image sensor 50 using the zoom lens 52 disposed on the front surface of the image sensor 50 as the first zoom magnification, and when performing the swing correction of the image sensor, the capturing range is illuminated by the light source using the light source lens as the second light condensing rate smaller than the first light condensing rate, and the second image is captured by the image sensor 50 using the zoom lens 52 as the first zoom magnification, and the specific range is cut out in the second image.

Accordingly, when the swing correction is performed, the light condensing rate becomes smaller than that when the swing correction is not performed, and thus, as the illumination caused by the light source also swings together with the swing of the monitoring camera 11, the monitoring camera 11 can reduce ununiformity of the illumination in the cut-out range of the image. Accordingly, in a case of performing the swing correction of the image sensor 50, the monitoring camera 11 can reduce deviation of the light distribution in the image, and can improve the image quality.

Modification Embodiments

As described above, the first embodiment is described as an example of the technology in the disclosure. However, the technology in the disclosure is not limited thereto, and can also be employed in the embodiment to which changing, replacing, adding, or omitting was performed.

In the first embodiment, an example in which the monitoring camera 11 is provided with the DSP 59 and the CPU 60 is illustrated, but the CPU 60 may have a function of the DSP 59 without providing the DSP 59 in the monitoring camera 11.

In the first embodiment, the processor may be configured physically in any manner. In addition, when using a programmable processor, it is possible to change the processing contents by changing the program, and thus, it is possible to increase a degree of freedom of design of the processor. The processor may be configured of one semiconductor chip, or may be physically configured of a plurality of semiconductor chips. In a case of being configured of the plurality of semiconductor chips, each control of the first embodiment may be respectively realized by each of the semiconductor chips. In this case, it is possible to consider to configure one processor by the plurality of semiconductor chips. In addition, the processor may be configured of a member (condenser or the like) having a function different from that of the semiconductor chip. In addition, one semiconductor chip may be configured to realize a function of processor and other functions. In addition, the plurality of processors may be configured of one semiconductor chip.

In the first embodiment, a configuration of the monitoring camera 11 is illustrated in FIG. 3, but each configuration may be realized by hardware, and may be realized by software.

Details Until Achieving Second Embodiment

In the camera illuminating apparatus described in JP-A-2007-134784, the light-emitting direction of the illumination changes in accordance with the zoom magnification of the camera, but the swing correction of the camera is not considered. In addition, when considering the swing correction of the camera, due to the characteristics of the swing generated in the camera, a case where an appropriate image is not necessarily obtained only by the electronic correction (that is, swing correction by image cutting-out) described in the first embodiment, can be achieved.

Second Embodiment

Here, in the second embodiment, considering the above-described situation, an example of the monitoring camera and the swing correction method which appropriately divide and perform the swing correction by using a plurality of methods of swing correction, and suppress deterioration of the image quality of the captured image, in accordance with the characteristics of the swing generated in the camera, will be described.

Figure 7:
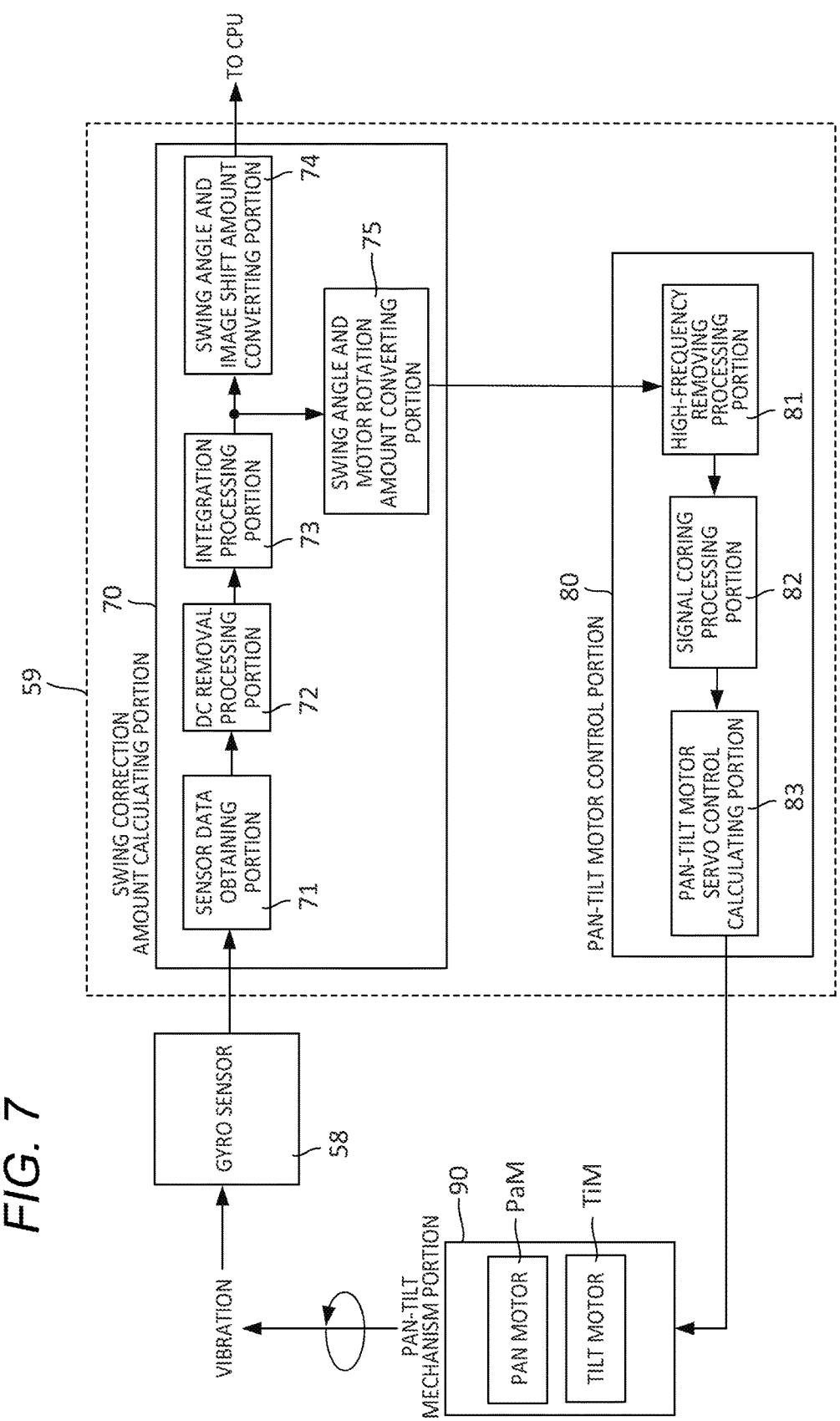
FIG. 7 is a block diagram illustrating an example of a hardware configuration of a monitoring camera according to a second embodiment.

FIG. 7 is a block diagram illustrating an example of a hardware configuration of the monitoring camera 11 according to the second embodiment.

The monitoring camera 11 of the second embodiment performs the electronic correction (that is, correction by the image cutting-out described in the first embodiment) with respect to the image captured by the image sensor 50 in a case where a frequency component that corresponds to a period of swing is high and an amplitude of the swing is small, in accordance with the swing detected value that indicates the swing amount of the monitoring camera 11 detected by the gyro sensor 58. Furthermore, the monitoring camera 11 performs the mechanical correction that performs at least one of the pan rotation and the tilt rotation to reduce the swing of the monitoring camera 11 in a case where the frequency component that corresponds to the period or the swing is low and the amplitude of the swing is large, in accordance with the swing detected value that indicates the swing amount of the monitoring camera 11 detected by the gyro sensor 58. In other words, the monitoring camera 11 performs the swing correction of the image (captured image) captured by the image sensor 50 by using two or more types of swing correction methods (that is, the above-described electronic correction and the mechanical correction).

The hardware configuration of the monitoring camera 11 of the second embodiment is the same as the hardware configuration of the monitoring camera 11 of the first embodiment, and in the description of FIG. 7, a configuration which overlaps the monitoring camera 11 of the first embodiment illustrated in FIG. 3 is given the same reference numeral, and description thereof will be simplified or omitted. In the monitoring camera 11 of the second embodiment, in the DSP 59 (refer to FIG. 7), a swing correction amount calculating portion 70 and a pan-tilt motor control portion 80 are provided to be executable.

The swing correction amount calculating portion 70 is configured to be executable, for example, in the DSP 59, and calculates the correction amount of the swing of the image captured by the capturing portion (for example, image sensor 50) based on an output (that is, the swing detected value that indicates the swing amount of the monitoring camera 11) of the gyro sensor 58 which is an example of the sensor. The swing correction amount calculating portion 70 may not be configured by using the DSP 59, for example, may be configured by using a large scale integrated circuit (LSI) or the CPU 60. The swing correction amount calculating portion 70 includes a sensor data obtaining portion 71, a DC removal processing portion 72, an integration processing portion 73, a swing angle and image shift amount converting portion 74, and a swing angle and motor rotation amount converting portion 75.

The sensor data obtaining portion 71 inputs and obtains data of an output (that is, the swing detected values that indicate the swing amounts in each of the pan direction and the tilt direction of the monitoring camera 11) of the gyro sensor 58. The swing detected value is a data value having a dimension of an angle speed, and specifically, is an angle speed that indicates a swing amount in the pan direction of the monitoring camera 11 and an angle speed that indicates the swing amount in the tilt direction of the monitoring camera 11. The sensor data obtaining portion 71 delivers the data of the output of the gyro sensor 58 to the DC removal processing portion 72.

The DC removal processing portion 72 is configured, for example, by using a high pass filter, removes a direct current (DC) component included in the data delivered from the sensor data obtaining portion 71, and delivers the data of the swing detected value in which the DC component is removed to the integration processing portion 73.

The integration processing portion 73 obtains the data having a dimension of the angle by performing the integration processing with respect to the data of the swing detected value delivered from the DC removal processing portion 72. Specifically, in the integration processing portion 73, each of the pan swing angle that indicates the swing angle in the pan direction of the monitoring camera 11 and the tilt swing angle that indicates the swing angle in the tilt direction of the monitoring camera 11, is obtained. The integration processing portion 73 delivers the pan swing angle and the tilt swing angle of the monitoring camera 11 to each of the swing angle and image shift amount converting portion 74 and the swing angle and motor rotation amount converting portion 75.

The swing angle and image shift amount converting portion 74 calculates the image shift amount for performing the swing correction based on the cut-out of the image in the CPU 60, by using the pan swing angle and the tilt swing angle of the monitoring camera 11 delivered from the integration processing portion 73. Specifically, the swing angle and image shift amount converting portion 74 reads out the swing angle conversion table (refer to FIG. 8A) in which a correspondence relation between the swing angle and the image shift amount is set from the memory 62, and calculates the image shift amount that corresponds to the pan swing angle and the tilt swing angle as the correction amount of the swing of the image. The computation result is input to the CPU 60 as an example of the swing correction portion, and in the CPU 60, the swing correction (that is, the cutting-out of the image) that corresponds to the image shift amount is performed.

FIG. 8A is a view illustrating a first example of the swing angle conversion table.

In the swing angle conversion table illustrated in FIG. 8A, the swing angle, the image shift amount, the pan motor rotation amount, and the tilt motor rotation amount are correlated with each other. The image shift amount is a parameter that indicates how much the images in each of the pan direction and the tilt direction should be deviated (that is, shifted) and cut out, in accordance with the swing angle. In addition, in FIG. 8A, the image shift amounts may be respectively set in a horizontal direction (that is, the swing in the pan direction) of video and in a vertical direction (that is, the swing in the tilt direction) of video. The pan motor rotation amount is a parameter that indicates how much amount of pulse should be supplied to a pan motor PaM for performing the pan rotation that corresponds to the swing angle from a stationary state, based on the stationary state where the monitoring camera 11 does not swing. The tilt motor rotation amount is a parameter that indicates how much amount of pulse should be supplied to a tilt motor TiM for performing the tilt rotation that corresponds to the swing angle from the stationary state, based on the stationary state where the monitoring camera 11 does not swing.

The swing angle and motor rotation amount converting portion 75 calculates the rotation amount (motor rotation amount) of the pan motor PaM and the tilt motor TiM which correspond to each of the swing angle by using the pan swing angle and the tilt swing angle of the monitoring camera 11 delivered from the integration processing portion 73. Specifically, the swing angle and motor rotation amount converting portion 75 reads out the swing angle conversion table (refer to FIG. 8A) in which the correspondence relation of the swing angle, the pan motor rotation amount, and the tilt motor rotation amount is set in advance, from the memory 62, and calculates the pan motor rotation amount and the tilt motor rotation amount which correspond to the pan swing angle and the tilt swing angle, as the correction amount of the swing of the image. The computation result is input to the pan-tilt motor control portion 80.

Figure 11A:
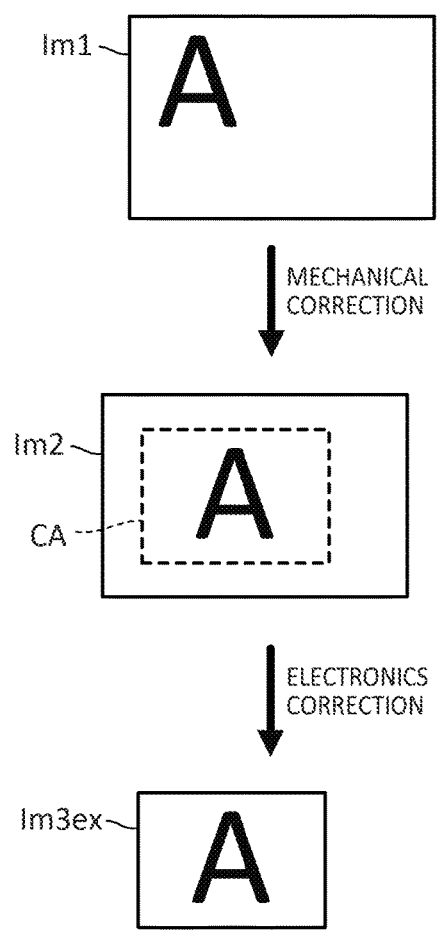
FIG. 11A is a view illustrating an output example of a captured image by mechanical correction and electronic correction.

The CPU 60 which is an example of the swing correction portion performs the swing correction by cutting out a part of the image captured by the image sensor 50 in accordance with the correction amount (for example, the image shift amounts which respectively correspond to the pan swing angle and the tilt swing angle) calculated by the swing correction amount calculating portion 70 (refer to FIG. 11A).

The pan-tilt motor control portion 80 which is an example of the rotation control portion is, for example, configured to be executable in the DSP 59, and generates a control signal that performs at least one of the pan rotation and the tilt rotation for reducing the swing of the monitoring camera 11 based on the output (that is, the swing detected value that indicates the swing amount of the monitoring camera 11) of the gyro sensor 58. The pan-tilt motor control portion 80 may not be configured by using the DSP 59, and for example, may be configured by using the LSI. The pan-tilt motor control portion 80 includes a high-frequency removing processing portion 81, a signal coring processing portion 82, and a pan-tilt motor servo control calculating portion 83.

The high-frequency removing processing portion 81 is, for example, configured by using a low pass filter, passes through only a high-frequency component of the motor rotation amount which is a temporally continuous value that is delivered from the swing angle and motor rotation amount converting portion 75, and removes or subtracts the high-frequency component of the motor rotation amount (refer to FIG. 8B). The high-frequency removing processing portion 81 delivers the pan motor rotation amount and the tilt motor rotation amount in which the high-frequency component is removed or subtracted, to the signal coring processing portion 82.

FIG. 8B is an explanation view illustrating an example of an operation outline of the high-frequency removing processing portion 81.

A horizontal axis of FIG. 8B indicates a frequency and a vertical axis of FIG. 8B indicates a motor rotation amount. The motor rotation amount is a temporally continuous value that is delivered from the swing angle and motor rotation amount converting portion 75. As illustrated in FIG. 8B, the high-frequency removing processing portion 81 converts the temporally continuous motor rotation amount that is delivered from the swing angle and motor rotation amount converting portion 75 onto the frequency axis, removes or subtracts the motor rotation amount in which the signal that indicates the motor rotation amount after the conversion becomes in a higher region than a cutoff frequency fp, and allows the motor rotation amount in which the signal that indicates the motor rotation amount after the conversion is in a lower region than the cutoff frequency fp to pass.

The signal coring processing portion 82 performs the processing of making the output of the pan motor rotation amount and the tilt motor rotation amount to be zero (0) in a case where the absolute value of the output (that is, the pan motor rotation amount and the tilt motor rotation amount of which the frequency is equal to or lower than the cutoff frequency fp) of the high-frequency removing processing portion 81 is equal to or less than a predetermined value AGth. The signal coring processing portion 82 delivers the pan motor rotation amount and the tilt motor rotation amount after the above-described processing, to the pan-tilt motor servo control calculating portion 83.

FIG. 8C is an explanation view illustrating an example of an operation outline of the signal coring processing portion 82.

A horizontal axis of FIG. 8C indicates an input (that is, the pan motor rotation amount and the tilt motor rotation amount which are delivered from the high-frequency removing processing portion 81), and a vertical axis of FIG. 8C indicates an output (that is, the pan motor rotation amount and the tilt motor rotation amount which are delivered from the high-frequency removing processing portion 81). As illustrated in FIG. 8C, the signal coring processing portion 82 performs processing of making the output of the pan motor rotation amount and the tilt motor rotation amount to be zero (0) in a case where the absolute value of the pan motor rotation amount and the tilt motor rotation amount which are delivered from the high-frequency removing processing portion 81 is equal to or less than the predetermined value AGth. Meanwhile, the signal coring processing portion 82 performs processing of outputting a value obtained by subtracting the predetermined value AGth from the input of the pan motor rotation amount and the tilt motor rotation amount in a case where the absolute value of the pan motor rotation amount and the tilt motor rotation amount which are delivered from the high-frequency removing processing portion 81 is equal to or less than the predetermined value AGth and the pan motor rotation amount and the tilt motor rotation amount are positive values. In addition, the signal coring processing portion 82 performs processing of outputting a value obtained by adding the predetermined value AGth from the input of the pan motor rotation amount and the tilt motor rotation amount in a case where the absolute value of the pan motor rotation amount and the tilt motor rotation amount which are delivered from the high-frequency removing processing portion 81 is equal to or less than the predetermined value AGth and the pan motor rotation amount and the tilt motor rotation amount are negative values.

Here, as described above, the monitoring camera 11 performs mechanical correction that performs at least one of the pan rotation and the tilt rotation to reduce the swing of the monitoring camera 11 in a case where the frequency component that corresponds to the period of swing is low and the amplitude of the swing is large. In other words, the monitoring camera 11 of the second embodiment does not perform either the pan rotation or the tilt rotation to reduce the swing in a case where swing having a short period of swing (that is, the swing having high frequency) and a small amplitude is detected.

This is because there is a concern that a load is applied to the embedded components (for example, mechanism component) in the monitoring camera 11 and negatively influences durability, when the monitoring camera 11 performs at least one of the pan rotation and the tilt rotation to reduce the swing, in a case where the swing having a short period of swing (that is, the swing having a high frequency) and a small amplitude is detected in the monitoring camera 11. In addition, the rotation of the pan housing 15 or the tilt housing 17 cannot follow the movement of the pan motor PaM or the tilt motor TiM in the monitoring camera 11, resonance is generated, a malfunction of the pan housing 15 or the tilt housing 17 occurs, an image to which appropriate swing correction is performed is not obtained, and there is a case where the image quality deteriorates.

Therefore, in a case where the swing having a short period (that is, the swing having a high frequency) and a small amplitude is detected, the high-frequency removing processing portion 81 removes or subtracts the component having a short period of swing (that is, component having a high frequency of the swing). Additionally, in a case where the swing having a small amplitude is detected, the signal coring processing portion 82 does not intentionally allow the mechanical correction to be performed with respect to the swing having a small amplitude (that is, to perform processing of making the output of the pan motor rotation amount and the tilt motor rotation amount zero). Accordingly, the monitoring camera 11 can suppress early deterioration of durability of embedded components of the monitoring camera 11 (that is, shortening the life span of the embedded components) or a malfunction of the swing correction.

The pan-tilt motor servo control calculating portion 83 generates a control signal for performing at least one of the pan rotation and the tilt rotation for reducing the swing of the monitoring camera 11 based on the output (that is, the pan motor rotation amount and the tilt motor rotation amount) of the signal coring processing portion 82. In other words, the pan-tilt motor servo control calculating portion 83 generates a control signal ideally for eliminating (practically for reducing) the swing of the monitoring camera 11, and outputs the control signal to a pan-tilt mechanism portion 90, by performing at least one of the pan rotation and the tilt rotation which are performed in an orientation reverse to the swing generated in the monitoring camera 11.

The pan-tilt mechanism portion 90 includes the pan motor PaM for rotating the pan housing 15 in the pan direction, and the tilt motor TiM for rotating the tilt housing 17 in the tilt direction. The pan-tilt mechanism portion 90 which is an example of the rotation mechanism portion performs at least one of the pan rotation and the tilt rotation in accordance with the control signal output from the pan-tilt motor servo control calculating portion 83. In other words, in a case where the swing having a long period (that is, the swing having a low frequency) and a large amplitude is detected in the monitoring camera 11, in order to reduce the swing, the pan-tilt mechanism portion 90 performs at least one of the pan rotation and the tilt rotation following the control signal generated by the pan-tilt motor servo control calculating portion 83.

Therefore, in the monitoring camera 11 of the second embodiment, the gyro sensor 58 detects the swing of the monitoring camera 11 in which the swing generated in the fixed surface itself of the body housing 13 is mitigated by the mechanical correction by the pan-tilt mechanism portion 90 for reducing the swing.

Specifically, the monitoring camera 11 can mitigate influence of the swing having a large amplitude which is the swing having a long period and a low frequency by performing at least one of the pan rotation and the tilt rotation based on the swing detected value of the gyro sensor 58. Accordingly, since the swing having a small amplitude which is the swing having a short period and a high frequency can be detected in the gyro sensor 58, by performing the electronic correction with respect to the image captured by the image sensor 50 in a case where the swing is detected (that is, the correction by the image cutting-out described in the first embodiment), the monitoring camera 11 can cut out and obtain an image which follows the characteristics of the swing, and can efficiently suppress deterioration of image quality of the captured image.

FIG. 11A is a view illustrating an output example of the image captured by the mechanical correction and the electronic correction.

In the uppermost step of FIG. 11A, before the mechanical correction and the electronic correction are performed, a captured image Im1 which is captured by the image sensor 50 of the monitoring camera 11 in which the swing is generated, and which includes, for example, the character "A" that is an object, is illustrated. In the intermediate step of FIG. 11A, a captured image Im2 which is captured by the image sensor 50 of the monitoring camera 11 in which the mechanical correction is performed, and which includes, for example, the character "A" that is an object, is illustrated. In the lowest step of FIG. 11A, a captured image Im3ex which is captured by the image sensor 50 of the monitoring camera 11 in which the mechanical correction and the electronic correction are performed, and which includes, for example, the character "A" that is an object, is illustrated.

The monitoring camera 11 of the second embodiment performs the mechanical correction by the pan-tilt mechanism portion 90 for reducing the swing generated in the monitoring camera based on the swing detected value of the gyro sensor 58 in a case where the swing having a large amplitude which is the swing having a long period of swing and a low frequency is detected by the gyro sensor 58. Accordingly, the CPU 60 obtains the captured image Im1 in which the character "A" is not at a position at the center of the capturing surface of the image sensor 50 before the mechanical correction, but it is possible to obtain the captured image Im2 in which the character "A" is positioned on the center side of the capturing surface of the image sensor 50 after the mechanical correction. Furthermore, after the mechanical correction, in a case where the gyro sensor 58 detects the swing having a small amplitude which is the swing having a short period of swing and a high frequency, the CPU 60 can obtain the captured image Im3ex by cutting out the image in a range (for example, cut-out range CA) of a part of the captured image Im2 captured by the image sensor 50. In addition, the cut-out range CA is set by the CPU 60 based on each of the image shift amounts which are calculated by the swing correction amount calculating portion 70 and correspond to the pan swing angle and the tilt swing angle.

In addition, in the second embodiment, the monitoring camera 11 may perform the electronic correction after performing the mechanical correction (refer to FIG. 11A), or may perform the mechanical correction after performing the electronic correction. In other words, in the second embodiment, the performing order of the mechanical correction and the electronic correction may be arbitrary in the monitoring camera 11. In addition, in the second embodiment, the monitoring camera 11 may perform only one of the mechanical correction and the electronic correction.

In addition, in the second embodiment, the monitoring camera 11 may set ON or OFF of the swing correction according to the setting information maintained in the memory 62 regarding the swing correction that uses a part cut out (that is, electronic correction) of the image (that is, captured image) captured by the image sensor 50, similar to the first embodiment. Furthermore, similar to the first embodiment, the monitoring camera 11 may switch ON or OFF of the swing correction via the switch or the like which is not illustrated, or may switch ON or OFF by a remote operation.

As described above, the monitoring camera 11 of the second embodiment can perform the pan rotation and the tilt rotation, captures the image of the object, detects the swing of the monitoring camera 11 in the gyro sensor 58, and calculates the correction amount (for example, each of the image shift amounts which correspond to the pan swing angle and the tilt swing angle) of the swing of the captured image by the swing correction amount calculating portion 70 based on the swing detected value of the gyro sensor 58. The monitoring camera 11 generates the control signal for performing at least one of the pan rotation and the tilt rotation for reducing the swing of the monitoring camera 11 by the pan-tilt motor control portion 80, based on the swing detected value of the gyro sensor 58. The monitoring camera 11 performs the swing correction of the image by the CPU 60 in accordance with the correction amount (for example, each of the image shift amounts that correspond to the pan swing angle and the tilt swing angle) calculated by the swing correction amount calculating portion 70. The monitoring camera 11 performs at least one of the pan rotation and the tilt rotation by the pan-tilt mechanism portion 90 in accordance with the control signal generated by the pan-tilt motor control portion 80.

Accordingly, the monitoring camera 11 can appropriately divide and perform the swing correction by using a plurality of swing correction methods (for example, mechanical correction by at least one of the pan rotation and the tilt rotation, and the electronic correction by cutting out a part of the image) in accordance with the characteristics (for example, the frequency which corresponds to the inverse number of the period of swing) of the swing generated in the monitoring camera 11, and can suppress deterioration of the image quality of the captured image.

In addition, the gyro sensor 58 detects the swing of the monitoring camera 11 which performs at least one of the pan rotation and the tilt rotation by the pan-tilt mechanism portion 90. Accordingly, the monitoring camera 11 can obtain the captured video that has mitigated the influence of the swing (that is, the swing having a large amplitude which is the swing having a long period and low frequency) of the monitoring camera 11 after the mechanical correction.

In addition, the monitoring camera 11 calculates the image shift amount related to the cutting-out of the image captured by the image sensor 50 as the correction amount in the swing correction amount calculating portion 70, and outputs the image obtained by cutting out a part of the image captured by the image sensor 50 in accordance with the image shift amount. Accordingly, after the mechanical correction, in a case where the swing having a small amplitude which is the swing having a short period and a high frequency is detected by the gyro sensor 58, the monitoring camera 11 can cut out and obtain an image that follows the characteristics of the swing, and can efficiently suppress the deterioration of image quality of the captured image, by performing the electronic correction with respect to the image captured by the image sensor 50.

In addition, the monitoring camera 11 generates the signal for not allowing the monitoring camera 11 to perform the pan rotation and the tilt rotation as the control signal, in a case where the absolute value of each of the pan rotation angle and the tilt rotation angle which corresponds to the swing detected values of the gyro sensor 58 is equal to or less than the predetermined value AGth. Accordingly, the monitoring camera 11 can suppress application of a load generated by the mechanical correction for reducing the swing in a case where the swing having a short period of swing (that is, the swing having a high frequency) and a small amplitude is detected, with respect to the embedded components (for example, mechanical components) in the monitoring camera 11, and negative influence on durability.

In addition, the gyro sensor 58 is disposed at a position at which the starting point of the detection axis of the swing of the monitoring camera 11 overlaps the optical axis Oc of the capturing portion (for example, the zoom lens 52). Accordingly, since the gyro sensor 58 is disposed at a position at which the gyro sensor 58 swings integrally with the optical system of the monitoring camera 11, it is possible to accurately detect the swing that matches the swing amount of the image captured by the image sensor 50 in accordance with the swing generated in the monitoring camera 11.

Modification Example of Second Embodiment

In a modification example of the second embodiment, an example of the monitoring camera 11 and the swing correction method which perform optical correction instead of the electronic correction of the second embodiment, will be described.

Figure 9:
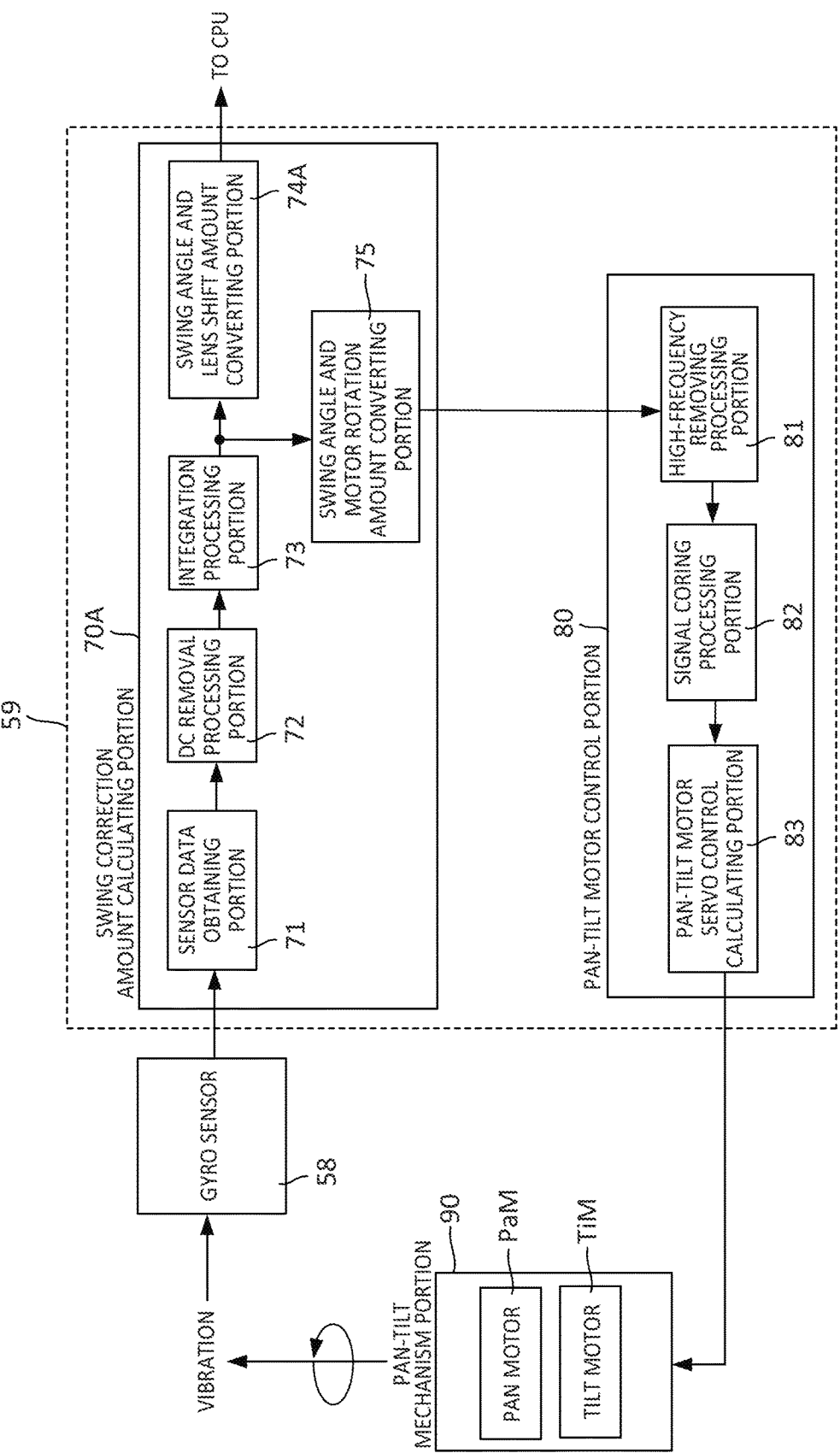
FIG. 9 is a block diagram illustrating an example of a hardware configuration of a monitoring camera according to a modification example of the second embodiment.

FIG. 9 is a block diagram illustrating an example of the hardware configuration of the monitoring camera 11 according to the modification example of the second embodiment.

The monitoring camera 11 of the modification example of the second embodiment performs the optical correction for changing the capturing range of the image captured by the image sensor 50 by driving the swing correction lens included in the capturing portion (refer to FIG. 10B) in the direction perpendicular to the optical axis Oc, in a case where the frequency component which corresponds to the period of swing is high and the amplitude of the swing is small, in accordance with the swing detected value that indicates the swing amount of the monitoring camera 11 detected by the gyro sensor 58, while the power source is ON. Furthermore, the monitoring camera 11 performs the mechanical correction that performs at least one of the pan rotation and the tilt rotation to reduce the swing of the monitoring camera 11, in a case where the frequency component that corresponds to the period of swing is low and the amplitude of the swing is large, in accordance with the swing detected value that indicates the swing amount of the monitoring camera 11 detected by the gyro sensor 58. In other words, the monitoring camera 11 performs the swing correction of the image (captured image) captured by the image sensor 50 by using the two swing correction methods (that is, the above-described optical correction and the mechanical correction).

The hardware configuration of the monitoring camera 11 of the modification example of the second embodiment is the same as the hardware configuration of the monitoring camera 11 of the first and the second embodiments, and in the description of FIG. 9, the configuration which overlaps the monitoring camera 11 of the first embodiment illustrated in FIG. 3 will be given the same reference numerals and the description thereof will be simplified or omitted. In the monitoring camera 11 of the modification example of the second embodiment, in the DSP 59 (refer to FIG. 3), a swing correction amount calculating portion 70A and the pan-tilt motor control portion 80 are provided to be executable.

The swing correction amount calculating portion 70A is, for example, configured to be executable in the DSP 59, and calculates the correction amount of the swing of the image captured by the capturing portion (for example, the image sensor 50) based on the output (that is, the swing detected value that indicates the swing amount of the monitoring camera 11) of the gyro sensor 58 that is an example of the sensor. The swing correction amount calculating portion 70A may not be configured by using the DSP 59, and for example, may be configured by using the LSI. The swing correction amount calculating portion 70A includes a sensor data obtaining portion 71, the DC removal processing portion 72, the integration processing portion 73, a swing angle and lens shift amount converting portion 74A, and the swing angle and motor rotation amount converting portion 75. The same configuration as the configuration illustrated in FIG. 7 is given the same reference numerals, and the description thereof will be simplified or omitted.

The swing angle and lens shift amount converting portion 74A calculates the lens shift amount for performing the swing correction based on the optical correction (for example, the driving in the direction perpendicular to the optical axis Oc of a swing correction lens 100) in the CPU 60, by using the pan swing angle and the tilt swing angle of the monitoring camera 11 which are delivered from the integration processing portion 73. Specifically, the swing angle and lens shift amount converting portion 74A reads out the swing angle conversion table (refer to FIG. 10A) in which the correspondence relation of the swing angle and the lens shift amount is set in advance, from the memory 62, and calculates the lens shift amount which corresponds to the pan swing angle and the tilt swing angle, as the correction amount of the swing of the image. The computation result is input to the CPU 60 which is an example of the swing correction portion, and in the CPU 60, the swing correction (that is, the optical correction) which corresponds to the lens shift amount is performed.

Figures 10A, 10B:
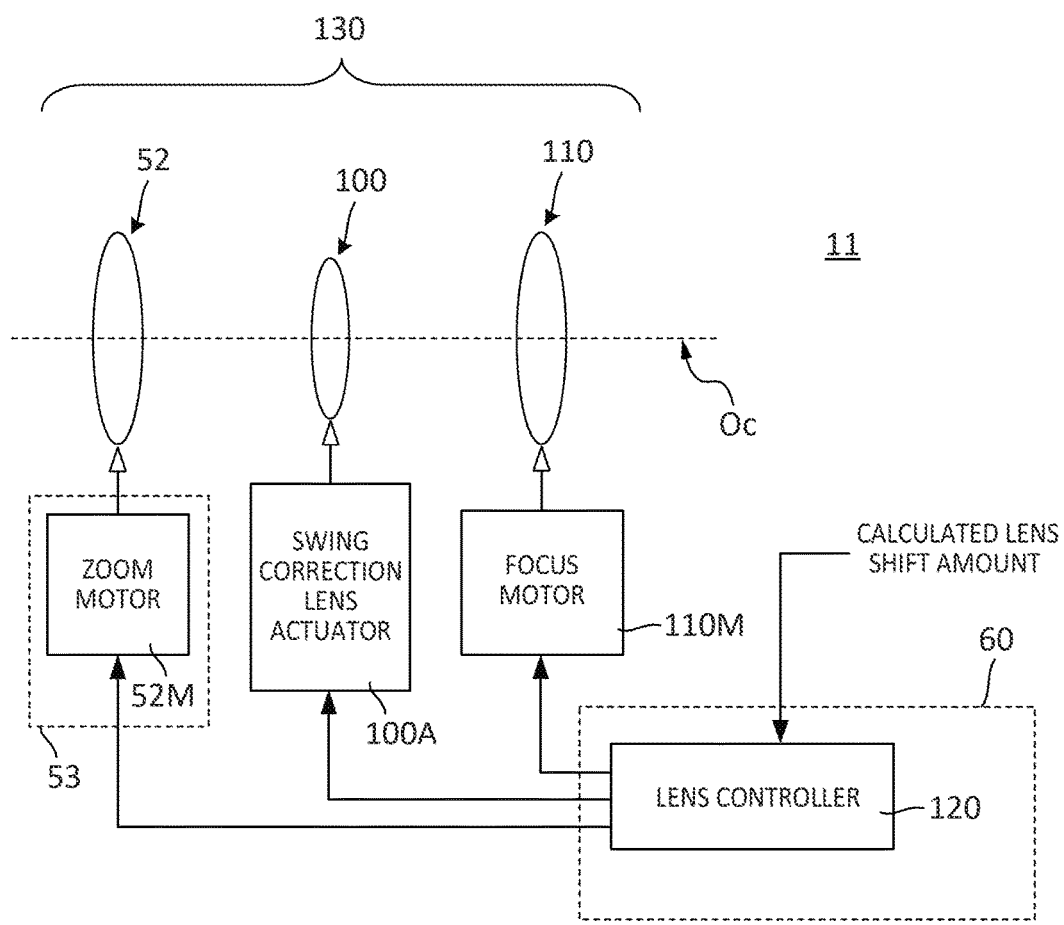
FIG. 10A is a view illustrating a second example of the swing angle conversion table.
FIG. 10B is a block diagram schematically illustrating an example of an operation outline of optical correction in the monitoring camera of FIG. 9.

FIG. 10A is a view illustrating a second example of the swing angle conversion table.

In the swing angle conversion table illustrated in FIG. 10A, the swing angle, the lens shift amount, the pan motor rotation amount, and the tilt motor rotation amount are correlated with each other. The lens shift amount is a parameter that indicates how much the swing correction lens 100 should be shifted (that is, how much the capturing range of the image sensor 50 should be shifted) in the direction perpendicular to the optical axis Oc, in accordance with the swing angle. In addition, in FIG. 10A, the lens shift amounts may be respectively set in a horizontal direction (that is, the swing in the pan direction) of video and in a vertical direction (that is, the swing in the tilt direction) of video.

FIG. 10B is a block diagram schematically illustrating an example of an operation outline of the optical correction in the monitoring camera 11 of FIG. 9.

In FIG. 10B, a configuration related to the optical correction performed by the CPU 60 in the monitoring camera 11 (more specifically, the monitoring camera 11 of FIG. 3) of FIG. 9, is illustrated. The monitoring camera 11 of the modification example of the second embodiment specifically includes the CPU 60, an optical system 130 included in the capturing portion, and a lens driving portion which drives each of the lenses that configure the optical system 130. The CPU 60 includes a lens controller 120. The optical system 130 includes the zoom lens 52 (refer to FIG. 3), the swing correction lens 100 used in the optical correction, and a focus lens 110. The lens driving portion includes the zoom lens controller 53, a swing correction lens actuator 100A, and a focus motor 110M.

In addition, not being limited to the monitoring camera 11 of the modification example of the second embodiment, in the monitoring camera 11 of the above-described first embodiment or the monitoring camera 11 of the second embodiment, the zoom lens 52, the zoom lens controller 53 including a zoom motor 52M, the focus lens 110, and the focus motor 110M are also provided in the optical system 130.

The lens controller 120 is provided, for example, to be executable in the CPU 60, and obtains the data of the lens shift amount calculated by the swing correction amount calculating portion 70A. The lens controller 120 generates and outputs the control signal for driving the swing correction lens 100 in the direction (specifically, the direction on a two-dimensional plane perpendicular to the optical axis Oc) perpendicular to the optical axis Oc only by the lens shift amount, with respect to the swing correction lens actuator 100A, based on the data of the lens shift amount.

In addition, the lens controller 120 outputs the control signal for changing a focused state of the object by moving the focus lens 110 along the optical axis Oc, with respect to the focus motor 110M. The lens controller 120 outputs the control signal for changing the focal length to the object by moving the zoom lens 52 along the optical axis Oc, with respect to the zoom motor 52M of the zoom lens controller 53.

The swing correction lens 100 can move on the two-dimensional plane perpendicular to the optical axis Oc of the optical system 130. The swing correction lens actuator 100A moves the swing correction lens 100 in the direction on two-dimensional plane perpendicular to the optical axis Oc only by the lens shift amount calculated by the swing correction amount calculating portion 70A in accordance with the control signal from the lens controller 120. Accordingly, as the optical correction, the monitoring camera 11 can change the capturing range of the image captured by the image sensor 50, and can obtain finely appropriate captured image in accordance with the swing having a small amplitude which is the swing having a short period of swing and a high frequency (refer to FIG. 11B).

The focus lens 110 can move along the optical axis Oc of the optical system 130. The focus motor 110M moves the focus lens 110 along the optical axis Oc for changing the focused state of the object in accordance with the control signal from the lens controller 120.

The zoom lens 52 can move along the optical axis Oc of the optical system 130. The zoom motor 52M moves the zoom lens 52 along the optical axis Oc for changing the focal length to the object in accordance with the control signal from the lens controller 120.

Figure 11B:
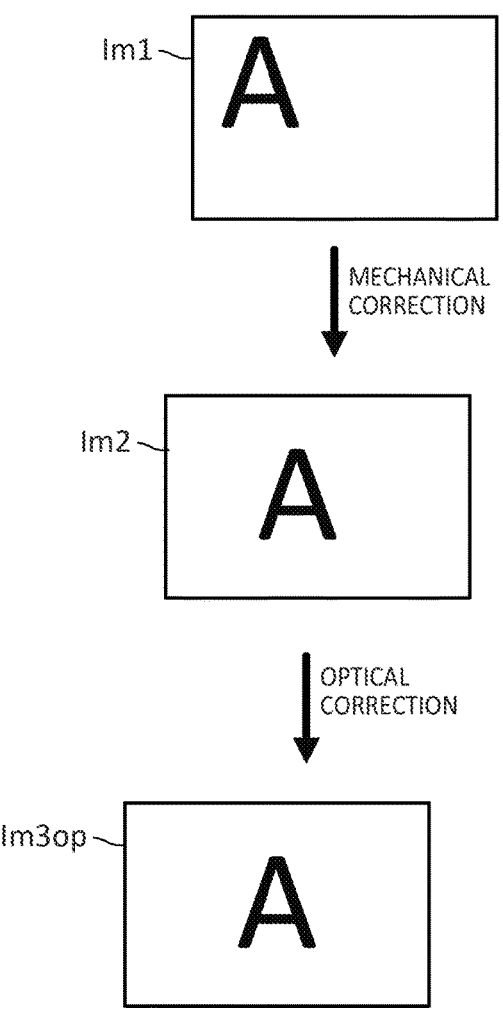
FIG. 11B is a view illustrating an output example of a captured image by mechanical correction and optical correction.

FIG. 11B is a view illustrating an output example of the captured image by the mechanical correction and the optical correction.

In the uppermost step of FIG. 11B, before the mechanical correction and the optical correction are performed, the captured image Im1 which is captured by the image sensor 50 of the monitoring camera 11 in which the swing is generated, and which includes, for example, the character "A" that is an object, is illustrated. In the intermediate step of FIG. 11B, the captured image Im2 which is captured by the image sensor 50 of the monitoring camera 11 in which the mechanical correction is performed, and which includes, for example, the character "A" that is an object, is illustrated. In the lowest step of FIG. 11B, a captured image Im3op which is captured by the image sensor 50 of the monitoring camera 11 in which the mechanical correction and the optical correction are performed, and which includes, for example, the character "A" that is an object, is illustrated.

The monitoring camera 11 of the modification example of the second embodiment performs the mechanical correction by the pan-tilt mechanism portion 90 for reducing the swing generated in the monitoring camera based on the swing detected value of the gyro sensor 58 in a case where the swing having a large amplitude which is the swing having a long period of swing and a low frequency is detected by the gyro sensor 58. Accordingly, the CPU 60 obtains the captured image Im1 in which the character "A" is not at a position at the center of the capturing surface of the image sensor 50 before the mechanical correction, but it is possible to obtain the captured image Im2 in which the character "A" is positioned on the center side of the capturing surface of the image sensor 50 after the mechanical correction. Furthermore, after the mechanical correction, in a case where the gyro sensor 58 detects the swing having a small amplitude which is the swing having a short period of swing and a high frequency, the CPU 60 can obtain the captured image Im3op by moving the swing correction lens 100 of the optical system 130 on the two-dimensional plane perpendicular to the optical axis Oc only by the lens shift amount calculated in accordance with the swing.

In addition, in the modification example of the second embodiment, the monitoring camera 11 may perform the optical correction after performing the mechanical correction (refer to FIG. 11B), or may perform the mechanical correction after performing the optical correction. In other words, in the modification example of the second embodiment, the performing order of the mechanical correction and the optical correction may be arbitrary in the monitoring camera 11. In addition, in the second embodiment, the monitoring camera 11 may perform only one of the mechanical correction and the optical correction.

As described above, the monitoring camera 11 of the modification example of the second embodiment includes the swing correction lens 100 which can be driven on the two-dimensional plane perpendicular to the optical axis Oc of the optical system 130 included in the capturing portion (refer to FIG. 10B). The monitoring camera 11 outputs the shift amount (specifically, lens shift amount) with respect to the optical axis Oc of the swing correction lens 100 as the correction amount in the swing correction amount calculating portion 70A, performs the optical correction (that is, changing the capturing range of the image captured by the image sensor 50) by driving the swing correction lens 100 in correlation with a displacement amount of the center of the swing correction lens 100 from the optical axis Oc in accordance with the lens shift amount, and outputs the image after the optical correction. Accordingly, after the mechanical correction, in a case where the swing having a small amplitude which is the swing having a short period and a high frequency is detected by the gyro sensor 58, by performing the optical correction that drives the swing correction lens 100 included in the optical system 130 in accordance with the swing detected value, the monitoring camera 11 can cut out and obtain an image that follows the characteristics of the swing, and can efficiently suppress the deterioration of image quality of the captured image.

The disclosure is advantageous in a monitoring camera and an image processing method which can the deviation of light distribution in the cut-out range of the image and can improve image quality even in a case of correcting the swing of the camera.

What is claimed is:

1. A monitoring camera which is capable of performing pan rotation and tilt rotation, the monitoring camera comprising:
   a capturing portion that captures an image;
   a sensor that detects swing of the monitoring camera;
   a swing correction amount calculating portion that calculates a correction amount of the swing of the image captured by the capturing portion, based on a swing detected value of the sensor;
   a rotation control portion that generates a control signal for performing at least one of the pan rotation and the tilt rotation to reduce the swing of the monitoring camera, based on the swing detected value of the sensor;
   a swing correction portion that performs swing correction of the image in accordance with the correction amount calculated by the swing correction amount calculating portion; and
   a rotation mechanism portion that performs at least one of the pan rotation and the tilt rotation in accordance with the control signal generated by the rotation control portion.

2. The monitoring camera according to claim 1, wherein the sensor detects the swing of the monitoring camera in which at least one of the pan rotation and the tilt rotation is performed by the rotation mechanism portion.

3. The monitoring camera according to claim 1, wherein the swing correction amount calculating portion calculates an image shift amount related to cut-out of the image captured by the capturing portion as the correction amount; and
wherein the swing correction portion outputs an image obtained by cutting out a part of the image captured by the capturing portion in accordance with the image shift amount calculated by the swing correction amount calculating portion.

4. The monitoring camera according to claim 1, wherein the capturing portion includes a swing correction lens which is capable of being driven in a direction perpendicular to an optical axis of the monitoring camera;
wherein the swing correction amount calculating portion calculates a shift amount with respect to the optical axis of the swing correction lens as the correction amount; and
wherein the swing correction portion changes a capturing range of the image captured by the capturing portion based on the driving of the swing correction lens corresponding to the shift amount calculated by the swing correction amount calculating portion and outputs the image with the changed capturing range.

5. The monitoring camera according to claim 1, wherein the rotation control portion generates a signal for not allowing the monitoring camera to perform the pan rotation and the tilt rotation as the control signal, when an absolute value of each of a pan rotation angle and a tilt rotation angle corresponding to the swing detected values of the sensor is equal to or less than a predetermined value.

6. The monitoring camera according to claim 1, wherein the sensor is disposed at a position where a starting point of a detection axis of the swing of the monitoring camera overlaps the optical axis of the capturing portion.

7. A swing correction method used in a monitoring camera being capable of performing pan rotation and tilt rotation, the swing correction method comprising:
- capturing an image by a capturing portion;
- detecting swing of the monitoring camera by a sensor;
- generating a control signal for performing at least one of the pan rotation and the tilt rotation by a processor to reduce the swing of the monitoring camera based on a swing detected value of the sensor;
- performing at least one of the pan rotation and the tilt rotation by a rotation mechanism portion in accordance with the generated control signal;
- calculating a correction amount of the swing of the image captured by the capturing portion based on the swing detected value of the sensor by the processor; and
- performing swing correction of the image by the processor in accordance with the calculated correction amount.

* * * * *